United States Patent
Kwon (10) Patent No.: US 8,451,363 B2
(45) Date of Patent: May 28, 2013

(54) PHOTOGRAPHING METHOD AND SYSTEM

(75) Inventor: Eun Seon Kwon, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 163 days.

(21) Appl. No.: 12/859,527

(22) Filed: Aug. 19, 2010

(65) Prior Publication Data

US 2011/0050976 A1     Mar. 3, 2011

(30) Foreign Application Priority Data

Aug. 26, 2009 (KR) .................. 10-2009-0079007

(51) Int. Cl.
*H04N 5/222* (2006.01)
*G06K 9/00* (2006.01)

(52) U.S. Cl.
USPC .................................... 348/333.01; 382/118

(58) Field of Classification Search
USPC ............... 348/169, 333.01–333.12; 396/264, 396/213
See application file for complete search history.

(56) References Cited

U.S. PATENT DOCUMENTS

2009/0237521 A1* 9/2009 Nishijima .............. 348/222.1
2010/0266206 A1* 10/2010 Jo et al. ..................... 382/190

FOREIGN PATENT DOCUMENTS

JP        2009065577 A  *  3/2009

* cited by examiner

*Primary Examiner* — Aung S Moe
*Assistant Examiner* — Mekonnen Dagnew
*(74) Attorney, Agent, or Firm* — Jefferson IP Law, LLP (57) ABSTRACT

A method and system for photographing in a terminal is provided. The method includes receiving an option for setting a face arrangement location on the viewfinder; detecting a face image on a screen of the viewfinder, determining whether the detected face image is located in the face arrangement location, and if the detected face image is not located in the face arrangement location, informing a user that the detected face image is not located in the face arrangement location. The photographing method and system can allow a user to easily adjust his/her face on the viewfinder and to take a photograph of himself/herself.

15 Claims, 9 Drawing Sheets

PHOTOGRAPHING METHOD AND SYSTEM

PRIORITY

This application claims the benefit under 35 U.S.C. §119 (a) of a Korean patent application filed on Aug. 26, 2009 in the Korean Intellectual Property Office and assigned Serial No. 10-2009-0079007, the entire disclosure of which is hereby incorporated by reference.

BACKGROUND OF THE INVENTION

1. Field of the Invention

The present invention relates to systems having a camera function. More particularly, the present invention relates to a photographing method and system that allows a user to easily take a self photograph.

2. Description of the Related Art

In recent years, most portable devices have been developed to provide a camera function, and the camera function has become increasingly popular. People enjoy taking photographs of themselves, which is called 'self photographing.' If a user takes a self photograph using a portable terminal, the user cannot see the viewfinder of the portable terminal. The user therefore cannot photograph the user's face in light of how the face is viewed on the viewfinder with a proper position and in a proper size.

To resolve this problem, portable terminals are generally equipped with a rear view mirror, a front-located camera, a rotational Liquid Crystal Display (LCD) viewer, a rotational lens, etc. However, conventional systems have difficulty precisely adjusting the location of the user's face on the viewfinder. Conventional systems are also disadvantageous because they require expensive hardware, thereby increasing the cost of the portable terminals.

SUMMARY OF THE INVENTION

An aspect of the present invention is to address the above-mentioned problems and/or disadvantages and to provide at least the advantages described below. Accordingly, an aspect of the present invention is to provide a photographing method and system that allows a user to easily adjust the location of the user's face on a viewfinder and to take a self photograph.

In accordance with an aspect of the present invention, a method for photographing in a mobile terminal is provided. The method includes receiving an option for setting a face arrangement location on the viewfinder; detecting a face image on a screen of the viewfinder, determining whether the detected face image is located in the face arrangement location, and if the detected face image is not located in the face arrangement location, informing a user that the detected face image is not located in the face arrangement location.

In accordance with another aspect of the present invention, a method for photographing in a mobile terminal is provided. The method includes receiving an option for setting a face arrangement location on the viewfinder, storing the set face arrangement location, loading the set face arrangement location, detecting a face image on a screen of the viewfinder, determining whether the detected face image is located in the set face arrangement location; and if the detected face image is not located in the set face arrangement location, informing a user that the detected face image is not located in the set face arrangement location.

In accordance with still another aspect of the present invention, a photographing system is provided. The system includes a face arrangement input unit for receiving an option for setting a face arrangement location on the viewfinder, a controller for detecting a face image on a screen of the viewfinder and determining whether the detected face image is located in the face arrangement location, and a feedback output unit for outputting a feedback signal. The face arrangement input unit outputs the option for setting a face arrangement location to the controller. If the controller determines that the detected face image is not located in the face arrangement location, the controller controls the feedback output unit to inform a user that the detected face image is not located in the face arrangement location.

In accordance with another aspect of the present invention, a portable device is provided. The portable device includes a camera module having a lens and a shutter; a viewfinder for showing an image corresponding to a region of view of the lens; a fact arrangement input unit for receiving an option for setting a face arrangement location in the viewfinder; and a controller for detecting a face on the viewfinder, for determining whether the detected face is located within the face arrangement location, and for controlling the camera module to take a picture based on the result of the determination.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the drawings represent exemplary embodiments of the invention, the drawings are not necessarily to scale and certain features may be exaggerated or omitted in order to better illustrate and explain the present invention. The same reference numbers are used throughout the drawings to refer to the same or similar parts.

Figure 1:
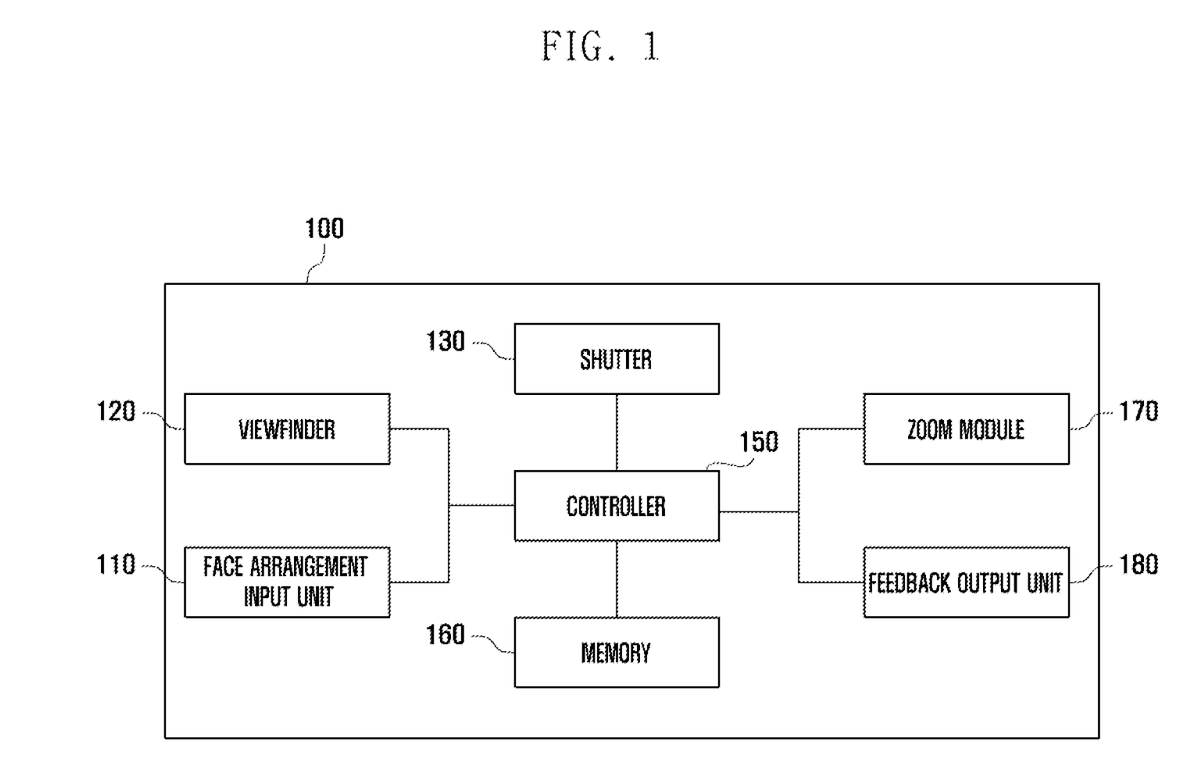
FIG. 1 is a schematic block diagram illustrating a photographing system according to an exemplary embodiment of the present invention.

FIG. 1 is a schematic block diagram illustrating a photographing system 100 according to an exemplary embodiment of the present invention.

Referring to FIG. 1, the photographing system 100 includes a face arrangement input unit 110, a viewfinder 120, a shutter 130, a controller 150, a memory 160, a zoom module 170, and a feedback output unit 180. The photographing system 100 may include additional and/or different units. Similarly, the functionality of two or more of the above units may be integrated into a single component. For example, the shutter 130 and the zoom module 170 may be components of a camera unit for taking photographs.

The viewfinder 120 shows what will appear in the region of view of the lens. The viewfinder 120 is well known in the art and thus a detailed description thereof is omitted.

The face arrangement input unit 110 inputs an option for setting a face arrangement location on the viewfinder 120 and outputs the option to the controller 150. The face arrangement input unit 110 inputs a certain range serving as a face arrangement area on the viewfinder 120 or a point serving as the center point of a face arrangement location on the viewfinder 120 and outputs the range to the controller 150. The configuration and operation of the face arrangement input unit 110 will be explained later with reference to FIGS. 3 and 4.

The shutter 130 controls the duration of photographic exposure according to the control of the controller 150. The shutter 130 is well known in the art and thus a detailed description is omitted.

The controller 150 detects the face image on a screen showing on the viewfinder 120 and determines whether the detected face image is located in the face arrangement location. If the controller 150 ascertains that the detected face image is not located in the face arrangement location, the controller 150 controls the feedback output unit 180 to inform the user that the face image on the viewfinder 120 is not located in the face arrangement location.

If the controller 150 determines that the detected face image is located in the face arrangement location, the controller 150 controls the feedback output unit 180 to inform the user that the detected face image on the viewfinder 120 is located in the face arrangement location. The controller 150 controls the zoom module 170 to match the size of the face image on the viewfinder 120 with that of the face arrangement area.

If the controller 150 determines that the face image on the viewfinder 120 is located at the face arrangement location, the controller 150 controls the shutter 130 to open. The configuration and operation of the controller 150 will be explained below with reference to FIGS. 2 to 8.

The memory 160 stores and outputs the face arrangement location set by the option for setting a face arrangement location, according to the control of the controller 150. The zoom module 170 performs a zooming-in or zooming-out operation according to the control of the controller 150.

The feedback output unit 180 informs a user whether the user's face is properly located on the viewfinder 120, according to the control of the controller 150. The feedback output unit 180 outputs a feedback signal according to the location of the user's face on the viewfinder 120. The output feedback serves to inform a user either that the face image on the viewfinder 120 is not located at the face arrangement location or that the face image shown on the viewfinder 120 is located at the face arrangement location.

The feedback output unit 180 may be implemented with a speaker or/and a Light Emitting Diode (LED). If the feedback output unit 180 is implemented with a speaker, the feedback output unit 180 outputs a sound as a feedback signal. If the feedback output unit 180 is implemented with an LED speaker, the feedback output unit 180 emits light as a feedback signal. The memory 160, zoom module 170, and feedback output unit 180 will be explained below with reference to FIGS. 2 to 9.

Figure 2:
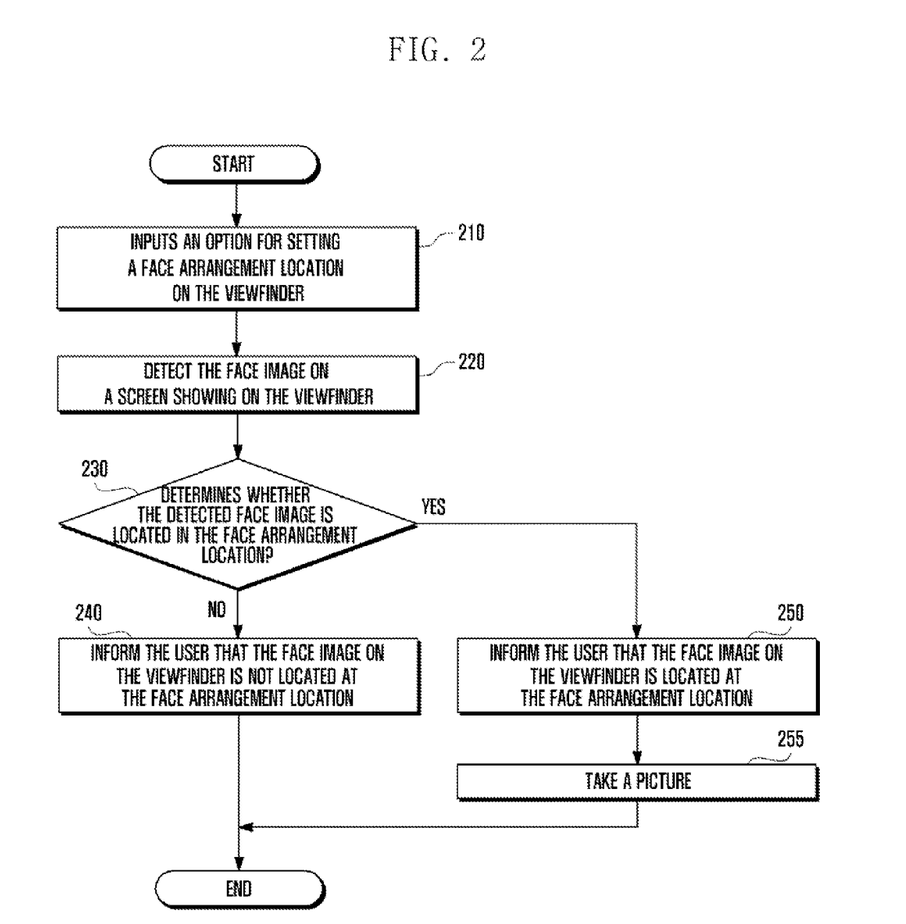
FIG. 2 is a flowchart that describes a first embodiment of a photographing method according to an exemplary embodiment of the present invention.

FIG. 2 is a flowchart that describes a first embodiment of a photographing method according to an exemplary embodiment of the present invention.

Referring to FIG. 2, the face arrangement input unit 110 inputs an option for setting a face arrangement location on the viewfinder 120 and outputs the option to the controller 150 at step 210. The option for setting a face arrangement location may be input via various types of input devices, such as a touch screen, a keypad, a keyboard, a touch pad, a mouse, a microphone, a temperature sensing module, etc. According to an exemplary embodiment of the present invention, the option for setting a face arrangement location is input via a touch screen of the viewfinder 120. A user can adjust the face arrangement location on the viewfinder 120 by touching the touch screen.

The face arrangement input unit 110 can input a certain range serving as a face arrangement area on the viewfinder 120, which will be explained below with reference to FIGS. 3 and 4. The face arrangement input unit 110 can also input a point serving as the center point of a face arrangement location on the viewfinder 120, which will be explained below with reference to FIG. 5.

Figure 3:
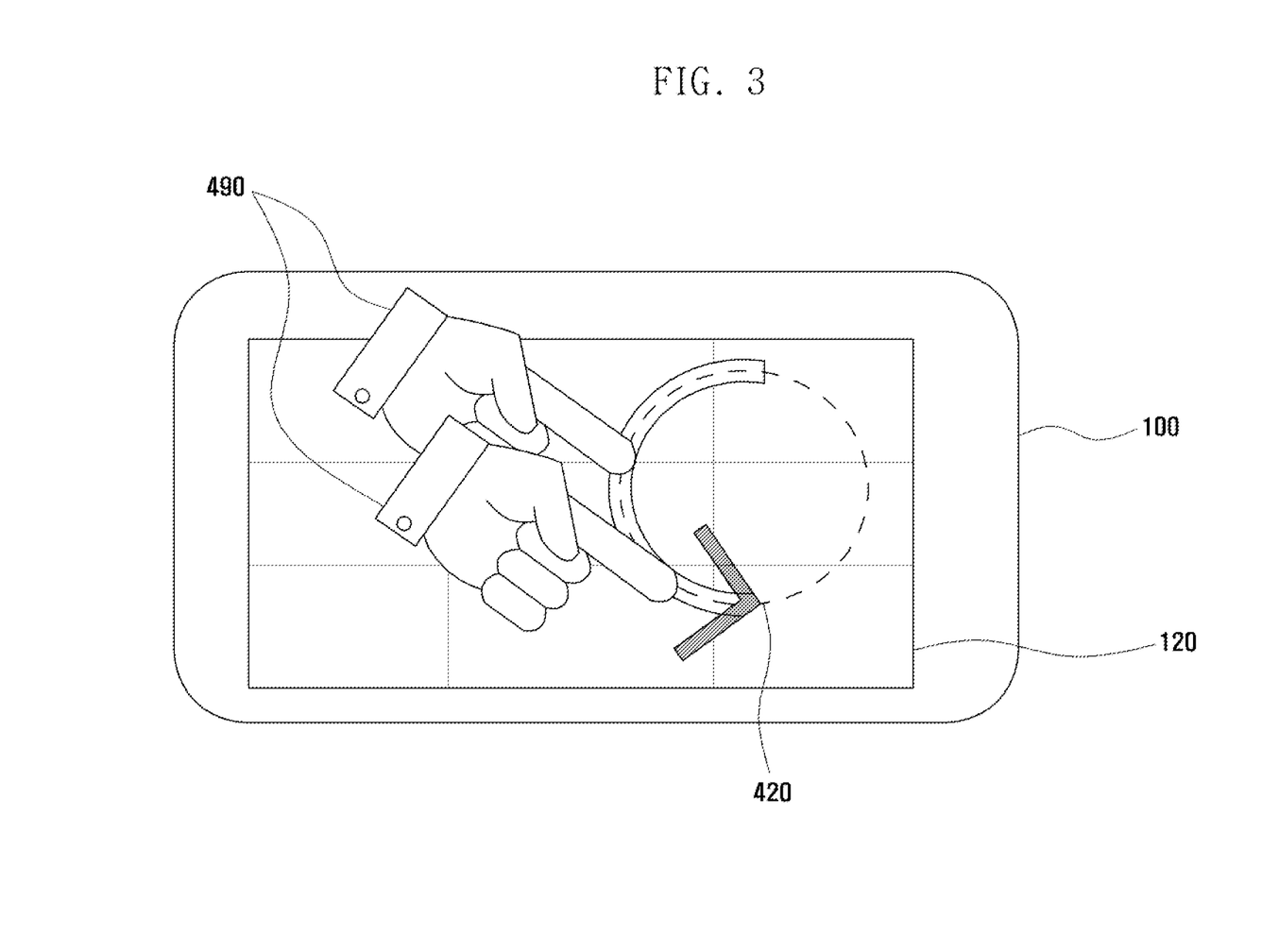
FIG. 3 and FIG. 4 are views that describe a method for inputting an option of a face arrangement location according to an exemplary embodiment of the present invention.
Figure 4:
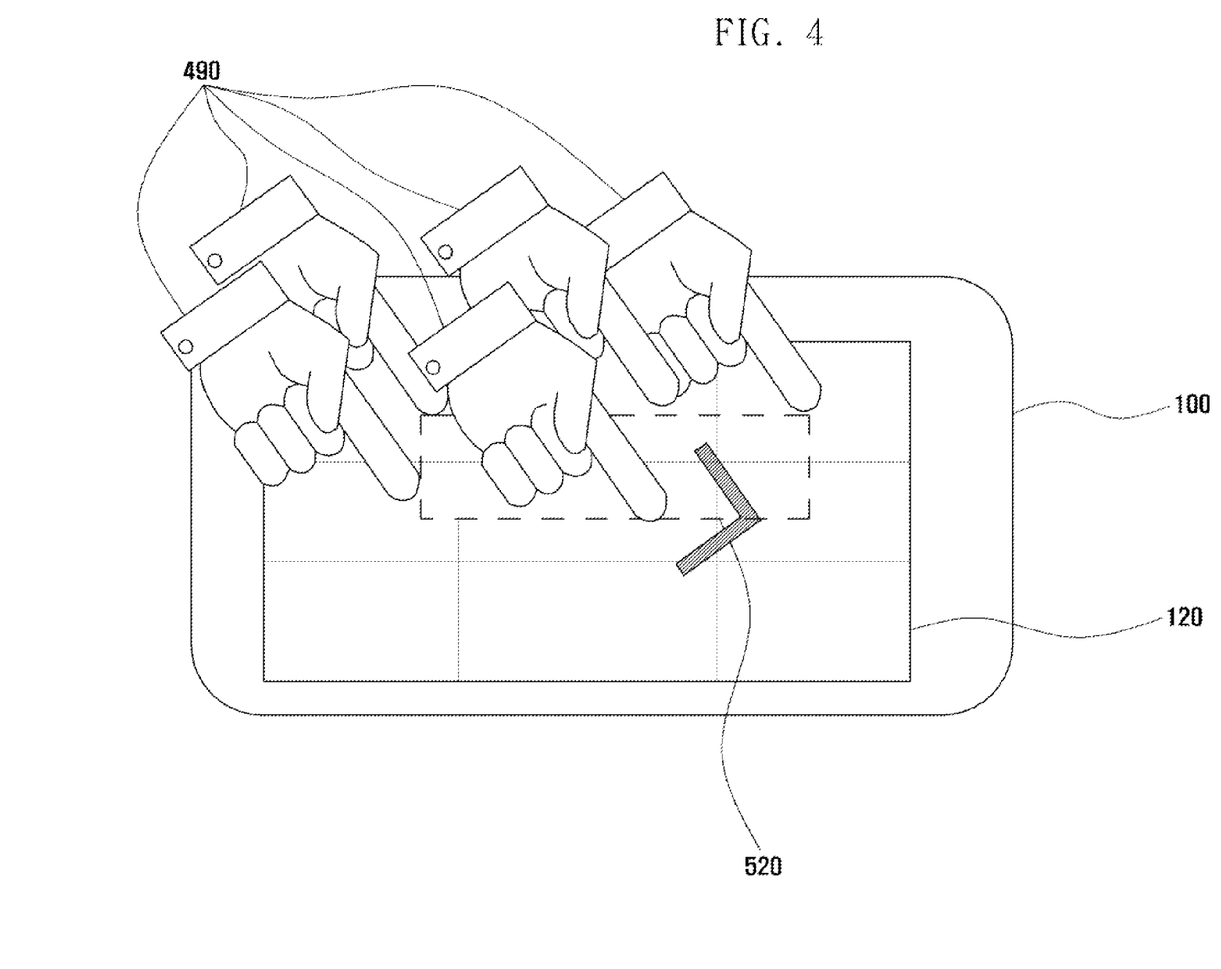

FIG. 3 and FIG. 4 are views that describe a method for inputting options of a face arrangement location according to an exemplary embodiment of the present invention.

Referring to FIGS. 3 and 4, the user's finger 490 touches the touch screen of the viewfinder 120 of a photographing system 100 in order to input certain regions for the face arrangement areas 420 and 520, respectively.

Referring to FIG. 3, the region for the face arrangement area 420 is a circular area that can contain one face image. Referring to FIG. 4, the region for the face arrangement area 520 is a rectangular area that can contain a plurality of face images. Although the regions for the face arrangement area shown in FIGS. 3 and 4 are circular or rectangular, respectively, it should be understood that the present invention is not limited to this exemplary embodiment. The user can touch the touch screen to input various shaped regions for the face arrangement area, thereby easily taking pictures. In addition to the touch screen, the face arrangement area can be set and input via various types of input devices, such as a keypad, a keyboard, a touch pad, a mouse, a microphone, a temperature sensing module, etc.

Referring back to FIG. 2, the controller 150 detects the face image on a screen showing on the viewfinder 120 at step 220. The technology that recognizes the face image, i.e., position, outline, angle, etc., on the viewfinder 120, which is called 'face recognition technology,' is well known to persons skilled in the art, so a detailed description is omitted.

The controller 150 determines whether the face image detected at step 220 is located in the face arrangement location set at step 210 at step 230. The controller 150 determines whether the face image is located in the user's set location.

In accordance with an exemplary embodiment of the present invention shown in FIGS. 3 and 4, the controller 150 determines whether the area of the face image detected at step 220 is consistent with the user's input face arrangement area. If the controller 150 ascertains that the area of the detected face image completely matches with the user's input face arrangement area or the two areas are matched within a certain degree, the controller 150 concludes that the area of the detected face image is consistent with the user's input face arrangement area. The sizes, locations, shapes, etc., of the two areas may be factors used to conduct the determination of step 230.

If the size difference between the two areas exceeds a preset limitation or the distance difference between the two areas (with respect to the center of the area) is greater than a preset value, the controller 150 concludes that the area of the detected face image is not consistent with the user's input face arrangement area. In addition, if the shapes between the two areas differ from each other, for example, if the area of the face image is circular but the user's input face arrangement area is rectangular, as shown in FIG. 4, the controller 150 concludes that the area of the detected face image is not consistent with the user's input face arrangement area.

The determination whether the two areas are matched may also be conducted based on the ratio of the size of the superimposed part of the two areas to the size of the non-superimposed part of the two areas. For example, if the ratio of the size of the superimposed part of the two areas to the size of the non-superimposed part of the two areas is greater than a preset value because the size of the superimposed part of the two areas is relatively greater than that of the non-superimposed part of the two areas, the controller 150 concludes that the two areas match with each other. Otherwise, the controller 150 concludes that the two areas are not consistent with each other.

If the controller 150 determines that the detected face image is not located in the face arrangement location at step 230, the controller 150 controls the feedback output unit 180 to inform the user that the face image on the viewfinder 120 is not located at the face arrangement location at step 240. In that case, the user can adjust the posture of the camera or the location of the face, so that the face image can be located at a proper location with an appropriate size on the viewfinder 120.

The feedback signal of the feedback output unit 180, informing the user that the face image on the viewfinder 120 is not located at the face arrangement location, may be a sound via a speaker or light emitted from an LED. The feedback signal will be explained below with reference to FIGS. 6 and 7.

If the size of the face image appearing on the viewfinder 120 is smaller than that of the user's input face arrangement area, the feedback output unit 180 outputs a feedback signal, such as a voice saying "Please move your face closer to the camera."

In accordance with an exemplary embodiment of the present invention, instead of outputting a voice, the controller 150 can automatically control the zoom module 170 to zoom in or out so that the size of the face image appearing on the viewfinder 120 is consistent with that of the user's input face arrangement area. For example, if the size of the face image appearing on the viewfinder 120 is smaller than that of the user's input face arrangement area, the controller 150 controls the zoom module 170 to zoom the lens in, so that the face image is enlarged on the viewfinder 120. If the size of the face image appearing on the viewfinder 120 is greater than that of the user's input face arrangement area, the controller 150 controls the zoom module 170 to zoom the lens out, so that the face image is reduced on the viewfinder 120. The automatic zooming-in or zooming-out control method does not require additional user operation, and thus provides more convenience to the user than the voice feedback method.

If the controller 150 determines that the detected face image is located in the face arrangement location at step 230, the controller 150 controls the feedback output unit 180 to inform the user that the face image on the viewfinder 120 is located in the face arrangement position at step 250.

The feedback signal of the feedback output unit 180, used to inform the user that the face image on the viewfinder 120 is located at the face arrangement location, may be a sound via a speaker or light emitted from LEDs. The feedback signal will be explained below with reference to FIGS. 6 and 7. When the user recognizes the feedback signal, the user operates the photographing system 100. The controller 150 controls the shutter 130 and takes a picture, according to the feedback signal at step 255.

If the controller 150 ascertains that the current face image is located at a proper location on the viewfinder 120, the controller 150 can immediately perform the photographing operation. This mode is useful when the user is located at a distance from the photographing system 100 and the user cannot use a remote control unit.

In accordance with an exemplary embodiment of the present invention, the photographing method can be modified in such a way that, according to the user's settings, a software distributer, or a photographing system manufacturer, both steps 250 and 255 are performed, steps 250 and 255 are not performed, or either only step 250 or 255 is performed. If the photographing system 100 determines that the face image is located at a proper location on the viewfinder 120, the photographing system 100 can immediately take a picture without outputting a feedback signal, or the photographing system 100 can inform the user that the face image is located at a proper location on the viewfinder 120 and allow the user to perform the photographing operation. In this case, while the photographing system 100 detects that the face image is located at a proper location on the viewfinder 120, the photographing system 100 does not output a feedback signal and does not perform a photographing operation.

Figure 5:
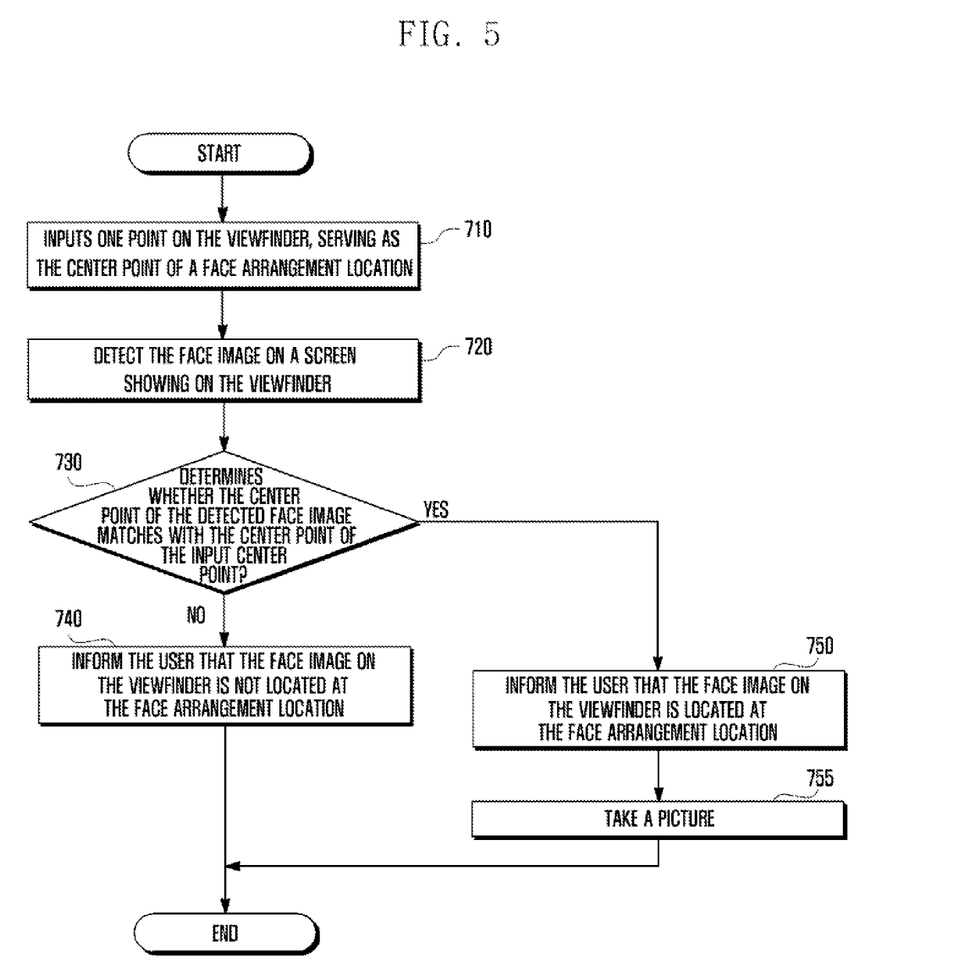
FIG. 5 is a flowchart that describes a second embodiment of a photographing method according to an exemplary embodiment of the present invention.

FIG. 5 is a flowchart that describes a second embodiment of a photographing method according to an exemplary embodiment of the present invention.

Referring to FIG. 5, in accordance with an exemplary embodiment of the present invention, when a user inputs one point on the viewfinder 120 as the center point of the face arrangement location, a determination is made whether a face image on the viewfinder 120 is consistent with the face arrangement location.

The face arrangement input unit 110 inputs one point on the viewfinder 120, serving as the center point of the face arrangement location at step 710. For example, the user touches a point on the touch screen of the viewfinder 120, as the center point of the face arrangement location.

The controller 150 detects the face image on a screen showing on the viewfinder 120 at step 720. The technology that recognizes the face image, i.e., position, outline, angle, etc., on the viewfinder 120, which is called 'face recognition technology,' is well known to persons skilled in the art, so a detailed description is omitted.

The controller 150 determines whether the input center point, is consistent with the detected center point of the face image, i.e., whether the distance between the input center point and the detected center point of the face image, is within a preset value at step 730.

If the controller 150 ascertains that the distance between the input center point and the detected center point of the face image exceeds a preset value at step 730, the controller 150 concludes that the input center point is not consistent with the detected center point of the face image. In that case, the controller 150 controls the feedback output unit 180 to inform the user that the face image is not located at the face arrangement location on the viewfinder 120 at step 740. The feedback output unit 180 outputs a feedback signal to inform the user that the face image is not located at the face arrangement location on the viewfinder 120. Since the process of step 740 is the same as step 240 of the method shown in FIG. 2, its detailed description is omitted.

If the controller 150 ascertains that the distance between the input center point and the detected center point of the face image is within a present value at step 730, the controller 150 concludes that the input center point is consistent with the detected center point of the face image. In that case, the controller 150 controls the feedback output unit 180 to inform the user that the face image is located at the face arrangement location on the viewfinder 120 at step 750. The feedback output unit 180 outputs a feedback signal to inform the user that the face image is located at the face arrangement location on the viewfinder 120.

Since the process of step 750 is the same as step 250 of the method shown in FIG. 2, a detailed description is omitted. Similarly, since the process of step 755 is the same as step 255 of the method shown in FIG. 2, its detailed description is omitted.

Figure 6:
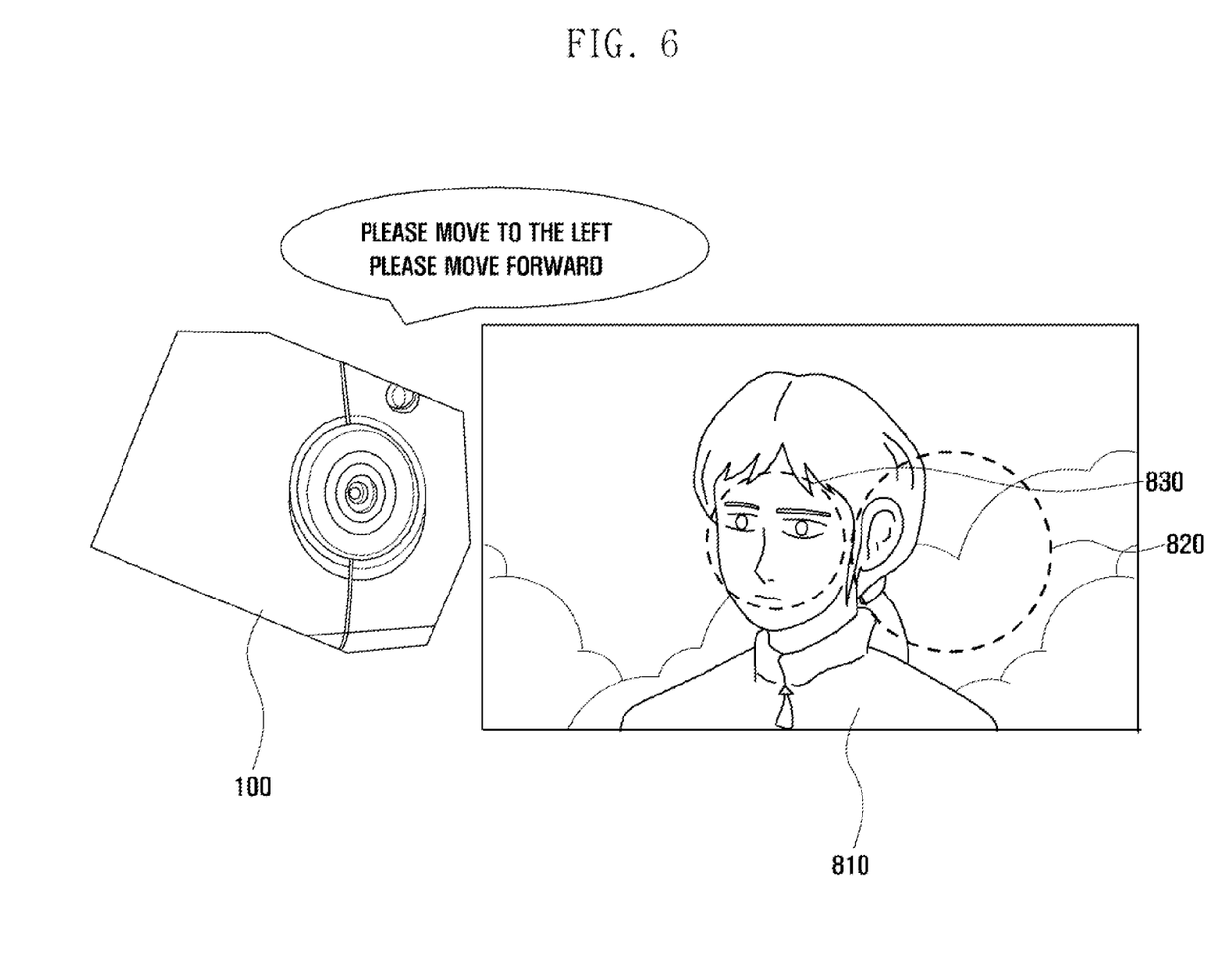
FIG. 6 and FIG. 7 are views that describe a method for outputting a feedback signal according to an exemplary embodiment of the present invention.
Figure 7:
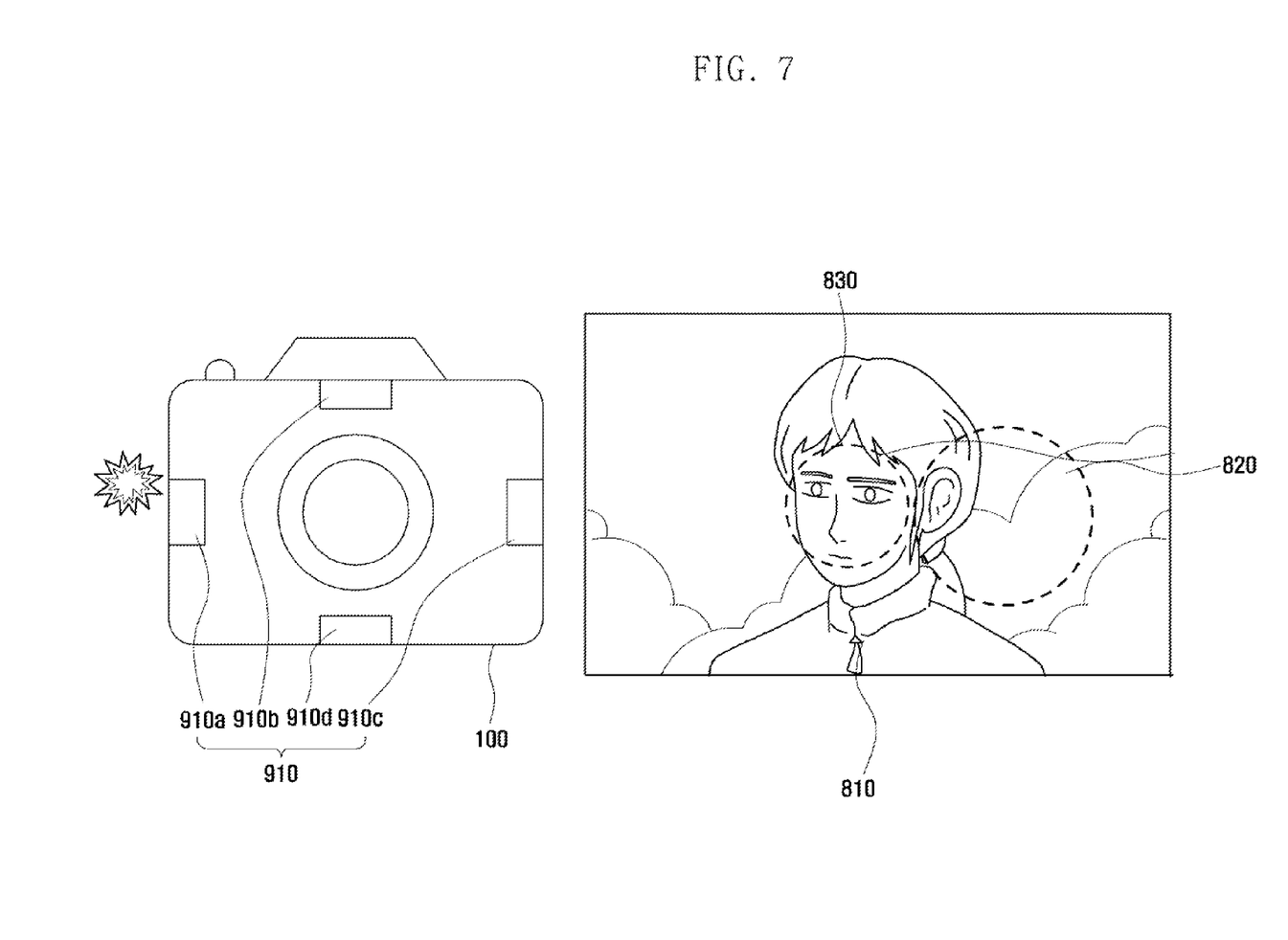

FIG. 6 and FIG. 7 are views that describe a method for outputting feedback according to an exemplary embodiment of the present invention.

Referring to FIG. 6, a user's input face arrangement area 820 is set on the viewfinder 810. A face image 830 detected by the controller 150 is not consistent with the face arrangement area 820. The image of the person appearing on the viewfinder 810 needs to be moved and located a little to the right so that the detected face image 830 is consistent with the location of the face arrangement area 820. In addition, since the size of the face image 830 is smaller than that of the face arrangement area 820, the person appearing on the viewfinder 810 needs to move closer to the camera so that the size of the face image 830 matches with that of the face arrangement area 820. In that case, the controller 150 controls the feedback output unit 180 to output a voice saying "Please move to the left", "Please move forward." The feedback output unit 180 outputs a voice as a feedback signal, according to the control of the controller 150. The person moves according to the voice, so that the user's face can be located at a proper location on the viewfinder 810. To achieve the exemplary embodiment shown FIG. 6, the feedback output unit 180 may include a speaker to output a voice signal.

Referring to FIG. 7, the feedback output unit 180 may also include an LED unit 910. As shown in FIG. 7, if the user's face image on the viewfinder 810 needs to be moved a little to the right, the feedback output unit 180 turns on a left LED 910*a* to emit light. If the user's face image on the viewfinder 810 needs to be moved a little to the left, the feedback output unit 180 turns on a right LED 910*c* to emit light. If the user's face image on the viewfinder 810 needs to be moved upward, the feedback output unit 180 turns on an upper LED 910*b* to emit light. If the user's face image on the viewfinder 810 needs to be moved downward, the feedback output unit 180 turns on a lower LED 910*d* to emit light. The feedback output unit 180 can turn on a corresponding LED once or can cause the corresponding LED to flash or blink.

According to the light of a corresponding LED as a feedback signal, the user can move so that the user's face image can be located at the proper location on the viewfinder 120. Although the exemplary embodiment shown in FIG. 7 is implemented with LEDs, it should be understood that the present invention is not limited to the shown exemplary embodiment. The exemplary embodiment may be modified in such a way to include a visual display device equivalent to the LED.

Figure 8:
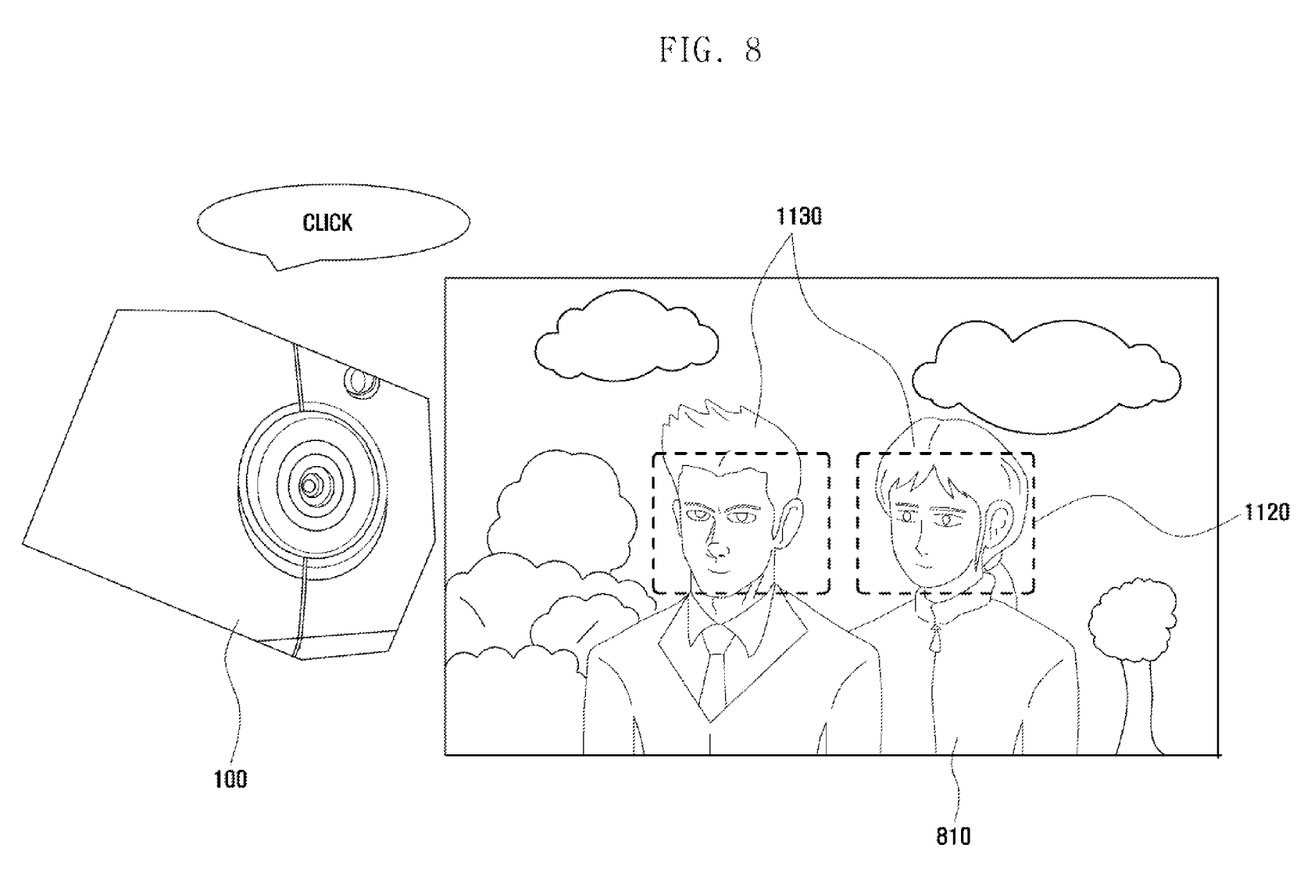
FIG. 8 is a view that describes a photographing method according to an exemplary embodiment of the present invention.

FIG. 8 is a view that describes a photographing method according to an exemplary embodiment of the present invention.

Referring to FIG. 8, the user's face image 1130 on the viewfinder 810 is consistent with the user's input face arrangement area 1120. In that case, the controller 150 can operate the shutter 130 to take a picture, immediately or after a certain amount of time set by a timer has elapsed.

Figure 9:
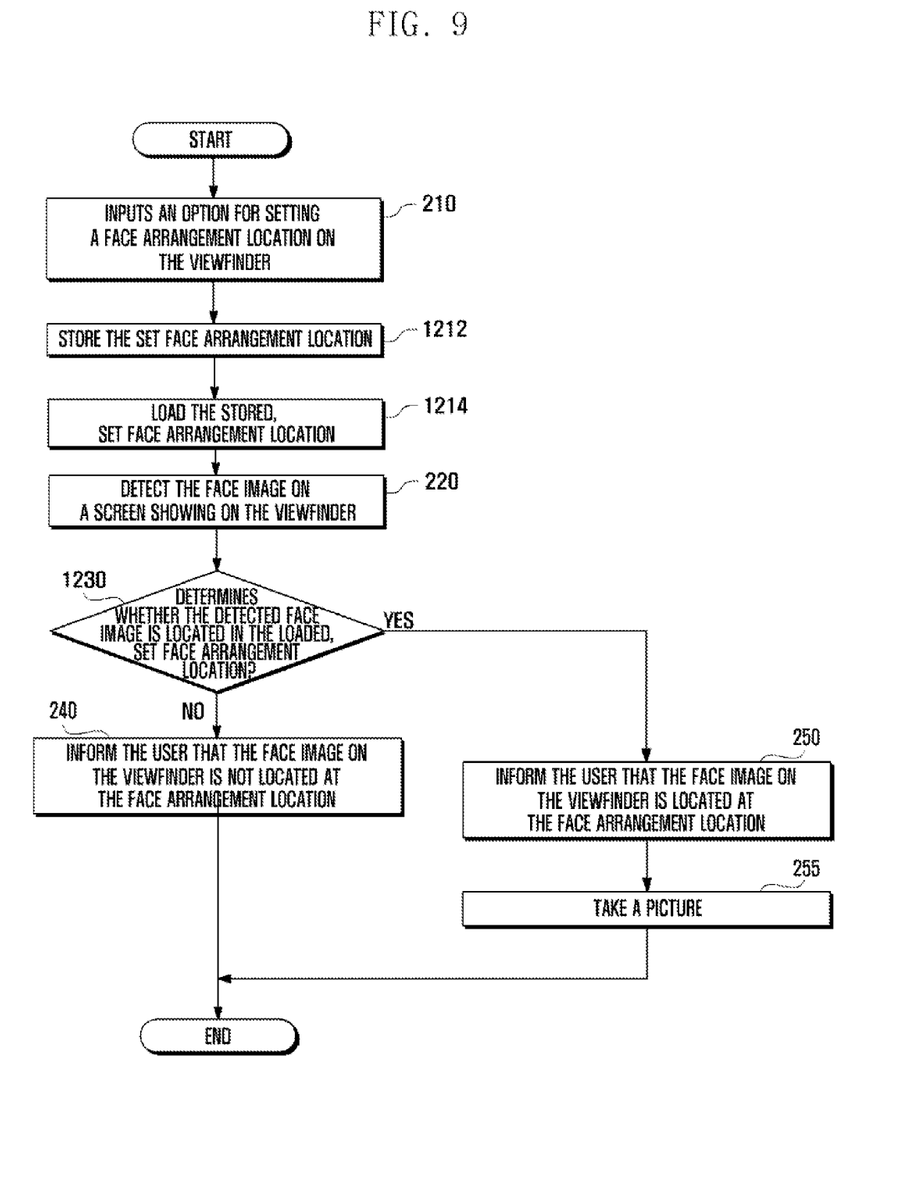
FIG. 9 is a flowchart that describes a third embodiment of a photographing method according to an exemplary embodiment of the present invention.

FIG. 9 is a flowchart that describes a third embodiment of a photographing method according to an exemplary embodiment of the present invention.

Referring to FIG. 9, the third embodiment is similar to the first embodiment of FIG. 2, except for steps 1212 and 1214.

It is assumed that, after a user inputs a face arrangement location, takes a picture at the face arrangement location, and performs other functions at step 210, the user needs to take a picture at the same face arrangement location. In that case, if the user must input the same face arrangement location again at step 210, the user may feel inconvenienced.

The third embodiment of FIG. 9 allows the user to store the user's previously input face arrangement location. The controller 150 stores the face arrangement location set at step 210 in the memory 160 at step 1212. The controller 150 loads the stored face arrangement location from the memory 160, according to the user's request at step 1214. Since step 220 has been already explained referring to FIG. 2, a detailed description is omitted.

The controller 150 determines whether the face image, detected at step 220, is located at the face arrangement location, loaded at step 1214, at step 1230. The processes, 240, 250 and 255, according to the determination at step 1230 have been already explained referring to FIG. 2, so their detailed descriptions are omitted.

The portable terminal includes portable electronic devices, such as a mobile phone, a personal digital assistant (PDA), a navigation terminal, a digital broadcast receiver, a portable multimedia player (PMP), digital cameras, and the like.

As described above, the photographing method and system according to exemplary embodiments of the present invention can allow a user to easily adjust his/her face on the viewfinder and to take a photograph of himself/herself.

While the invention has been shown and described in with reference to certain exemplary embodiments thereof, it will be understood by those skilled in the art that various changes in form and details may be made therein without departing from the spirit and scope of the invention as defined by the appended claims and their equivalents.

What is claimed is:

1. A method for photographing in portable terminal, the method comprising:
   receiving an option for setting a face arrangement location on a viewfinder;
   detecting a face image on a screen of the viewfinder;
   determining whether the detected face image is located in the face arrangement location; and
   if the detected face image is not located in the face arrangement location, informing a user that the detected face image is not located in the face arrangement location,
   wherein the receiving of the option comprises receiving a point on the viewfinder, the point being selected by a user and serving as a center point of the face arrangement location, and
   wherein the determining of whether the detected face image is located in the face arrangement location comprises determining whether a center point of the detected face image matches with the center point of the face arrangement location.

2. The method of claim 1, wherein:
   the receiving of the option comprises receiving a certain range on the viewfinder, the certain range serving as a face arrangement area; and
   the determining of whether the detected face image is located in the face arrangement location comprises determining whether an area of the detected face image matches with the face arrangement area.

3. The method of claim 2, further comprising:
   zooming a lens in or out to match the size of the face image on the viewfinder with that of the face arrangement area.

4. The method of claim 1, further comprising:
   photographing the face image if the detected face image is located in the face arrangement location.

5. The method of claim 1, further comprising:
   if the detected face image is located in the face arrangement location, informing a user that the detected face image is located in the face arrangement location.

6. The method of claim 1, wherein the informing of the user that the detected face image is not located in the face arrangement location comprises:
   outputting at least one of a sound signal and/or a light signal.

7. A photographing system, comprising:
   a face arrangement input unit for receiving an option for a user to set a face arrangement location on a viewfinder, and for receiving a point on the viewfinder, the point serving as a center point of the face arrangement location;
   a controller for detecting a face image on a screen of the viewfinder and determining whether the detected face image is located in the face arrangement location, and for determining whether a center point of the detected face image matches with the center point of the face arrangement location; and
   a feedback output unit for outputting a feedback signal,
   wherein the face arrangement input unit outputs the option for setting a face arrangement location to the controller, and
   wherein, if the controller determines that the detected face image is not located in the face arrangement location, the controller controls the feedback output unit to inform a user that the detected face image is not located in the face arrangement location.

8. The photographing system of claim 7, wherein:
   the face arrangement input unit receives a certain range on the viewfinder, the certain range serving as a face arrangement area; and
   the controller determines whether an area of the detected face image matches with the face arrangement area.

9. The photographing system of claim 8, further comprising:
   a zoom module,
   wherein the controller controls the zoom module to zoom a lens in or out to match the size of the face image on the viewfinder with that of the face arrangement area.

10. The photographing system of claim 7, further comprising:
    a shutter,
    wherein, when the controller determines that the detected face image is located in the face arrangement location, the controller controls the shutter to photograph the face image.

11. The photographing system of claim 7, wherein, when the controller determines that the detected face image is located in the face arrangement location, the controller controls the feedback output unit to inform a user that the detected face image is located in the face arrangement location.

12. The photographing system of claim 7, wherein the feedback output unit outputs a sound signal or/and a light signal.

13. A portable device, comprising:
    a camera module having a lens and a shutter;
    a viewfinder for showing an image corresponding to a region of view of the lens;
    a face arrangement input unit for receiving an option for a user to set a face arrangement location in a viewfinder, and for receiving a point specifying a center of the face arrangement location; and
    a controller for detecting a face on the viewfinder, for determining whether the detected face is located within the face arrangement location, for controlling the camera module to take a picture based on the result of the determination, and for determining whether the detected face is located within the face arrangement location based on a comparison between the input point and a center point of the detected face.

14. The portable device of claim 13, further comprising:
    a feedback output unit for providing feedback to a user,
    wherein, when the controller determines that the detected face is not located within the face arrangement location, the controller controls the feedback output unit to provide feedback indicating to the user that the detected face is not located within the face arrangement location.

15. The portable device of claim 13, wherein the face arrangement input unit receives a face arrangement area, and the controller determines whether the detected face is located within the face arrangement location based on a comparison between the input face arrangement area and an area of the detected face.

* * * * *